United States Patent
Cole et al.

(10) Patent No.: US 6,688,425 B2
(45) Date of Patent: Feb. 10, 2004

(54) INDUCTION SYSTEM WITH LOW PASS FILTER FOR TURBO CHARGER APPLICATIONS

(75) Inventors: Roderic Cole, Chatham (CA); Mark Letourneau, Dover Centre (CA); Jason Pettipiece, Chatham (CA)

(73) Assignee: Siemens VDO Automotive, Inc., Chatham (CA)

( * ) Notice: Subject to any disclaimer, the term of this patent is extended or adjusted under 35 U.S.C. 154(b) by 0 days.

(21) Appl. No.: 10/267,980

(22) Filed: Oct. 9, 2002

(65) Prior Publication Data

US 2003/0066706 A1 Apr. 10, 2003

Related U.S. Application Data

(60) Provisional application No. 60/328,777, filed on Oct. 9, 2001.

(51) Int. Cl.$^7$ ............................. F01N 1/02; F02M 35/12
(52) U.S. Cl. ........................................ 181/264; 181/270
(58) Field of Search ............................... 181/249, 247, 181/272, 264, 269, 270, 229, 212, 255; 123/184.21; 138/178

(56) References Cited

U.S. PATENT DOCUMENTS

| 4,133,479 A | * | 1/1979 | Musitano et al. | ............ 181/264 |
| 4,807,439 A | * | 2/1989 | Hain et al. | ................... 181/252 |
| 4,969,536 A | * | 11/1990 | Allen | ......................... 181/269 |
| 5,173,576 A | * | 12/1992 | Feuling | ........................ 181/247 |
| 5,563,382 A | * | 10/1996 | Choyce | ....................... 181/230 |
| 5,615,554 A | * | 4/1997 | Gobert | ........................ 181/249 |
| 5,962,107 A | * | 10/1999 | Lowery et al. | ............. 181/288 |
| 6,024,189 A | * | 2/2000 | Heuser | ........................ 181/264 |

FOREIGN PATENT DOCUMENTS

| DE | 19703414 | 8/1998 |
| WO | WO 97/09527 | 3/1997 |

OTHER PUBLICATIONS

International Search Report, dated Mar. 21, 2003.
U.S. patent application entitled: "Induction System With Low Pass Filter for Turbo Charger Applications", filed Sep. 26, 2002. No Ser. No. Assigned as yet.

* cited by examiner

*Primary Examiner*—Robert Nappi
*Assistant Examiner*—Eduardo Colon-Santana

(57) ABSTRACT

A flow tube for an induction system with a turbo charger defines a longitudinal flow path and includes a noise attenuation plate positioned within the flow tube. A plurality of ribs formed on an internal surface of the tube. The ribs are spaced apart from one another and are tuned to a desired frequency. The noise attenuation plate includes a plurality of holes having varying diameter and depths. When acoustic energy created by the turbo charger encounters the noise attenuation plate and the ribs, the change in impedance results in acoustic reflections back toward the turbo charger. Thus the noise attenuation plate cooperates with the ribs to serve as a low pass filter that attenuates high frequencies while allowing lower frequencies through.

18 Claims, 3 Drawing Sheets

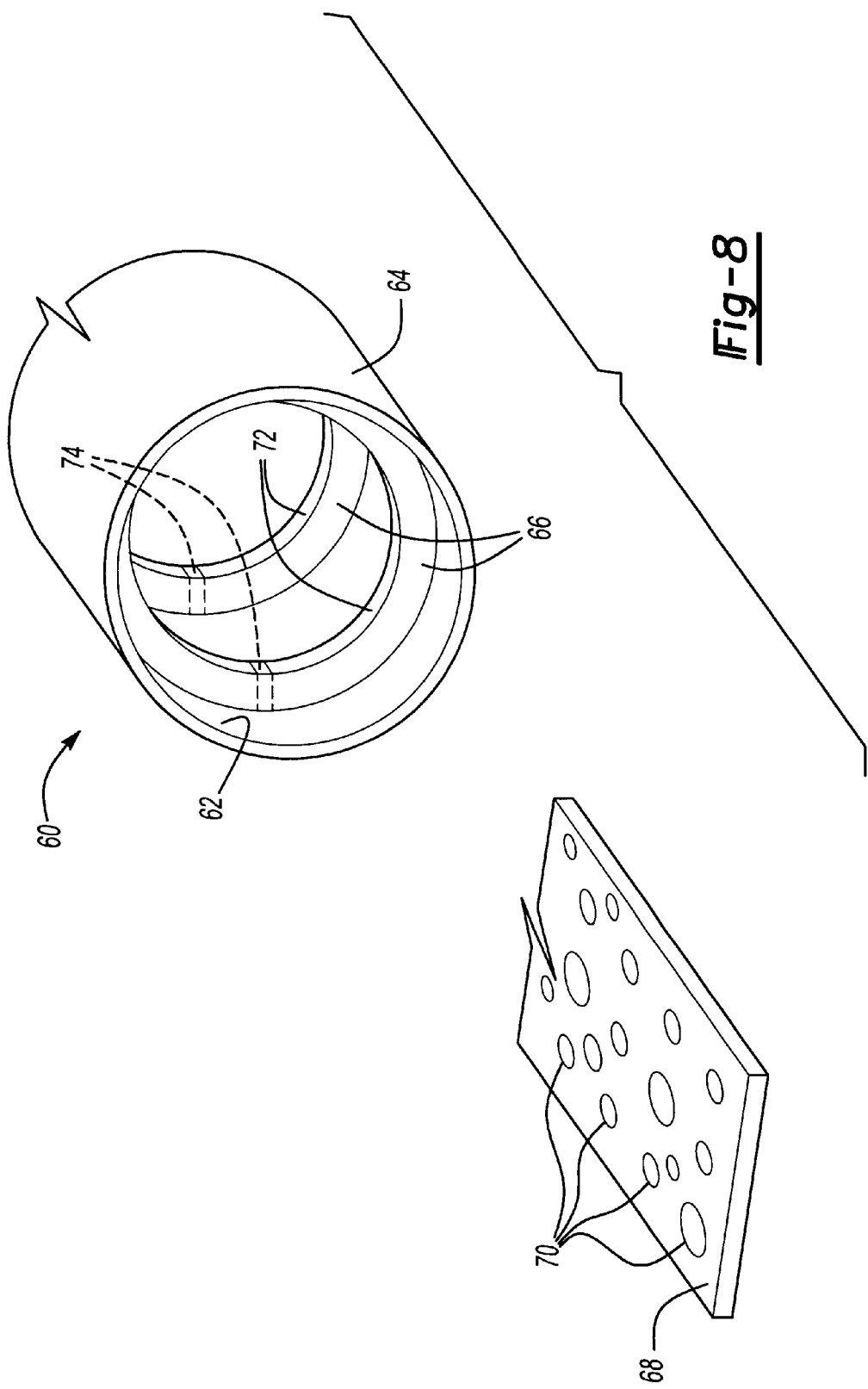

INDUCTION SYSTEM WITH LOW PASS FILTER FOR TURBO CHARGER APPLICATIONS

CROSS-REFERENCE TO RELATED APPLICATIONS

The application claims priority to U.S. Provisional application No. 60/328,777, which was filed on Oct. 9, 2001.

BACKGROUND OF THE INVENTION

This invention relates to a flow tube having a low pass filter positioned in the flow path. Specifically a noise attenuation plate cooperates with ribs formed on internal surfaces of the flow tube to reduce high frequency whistle generated by a turbo charger.

The use of a turbo charger is a simple, compact, and effective way to increase engine power without increasing the size of the engine itself. Turbo chargers allow an engine to burn more fuel and air by packing more into existing engine cylinders. Typically, turbo chargers are attached to an engine exhaust manifold with exhaust from the cylinders causing a turbine to spin. The turbine is connected by a shaft to a compressor, positioned between an air filter and an intake manifold, which pressurizes air going into the cylinders. Both the turbine and the compressor include blades or impellers, which turn at very high speeds during operation.

As the blades rotate, a high frequency whistling noise is generated, which is undesirable. Traditionally, an absorptive material is used to dissipate the unwanted acoustic energy. However, the use of this material increases the risk of engine contamination and can lead to increased engine maintenance or premature engine failure. Further, installation of the absorptive material increases assembly time and cost.

Thus, it is desirable to have a method and system for reducing noise generated by a turbo charger without risking engine contamination, as well as overcoming the other above mentioned deficiencies with the prior art.

SUMMARY OF THE INVENTION

A flow tube for an induction system includes an inner surface that defines a flow path. A plate is positioned in the flow path to form a low pass filter. The low pass filter attenuates high frequencies while permitting low frequencies to flow through.

In a preferred embodiment, the flow tube includes a plurality of rib members formed on the inner surface. The ribs are longitudinally spaced apart from one another along the length of the flow tube. Preferably, each ribbed is spaced at a predetermined equal distance from the next rib. The ribs and plate positioned within the flow path, cooperate to attenuate frequencies above a predetermined level as acoustic energy generated by a turbo charger enters the flow path.

Preferably, the plate includes a plurality of tuned holes that are used to attenuate high frequencies. The holes can be of varying diameter and varying depth. Further, the holes can be formed in a symmetric or non-symmetric pattern on the upper and/or lower surfaces of the plate.

The flow tube is preferably used in an induction system for an engine with a turbo charger. When the high frequency acoustic energy generated by the turbo charger encounters the rib and plate formations, the change in impedance causes reflections back toward the turbo charger. Thus, the plates and ribs form a low pass filter mechanism that significantly reduces the high pitch whine generated by the turbo charger.

The subject system and method reduces the magnitude of undesirable noise while eliminating the risk of engine contamination. These and other features of the present invention can be best understood from the following specifications and drawings, the following of which is a brief description.

BRIEF DESCRIPTION OF THE DRAWINGS

FIG. 8 is an exploded view of an alternate embodiment of a flow tube assembly.

DETAILED DESCRIPTION OF A PREFERRED EMBODIMENT

Figure 1:
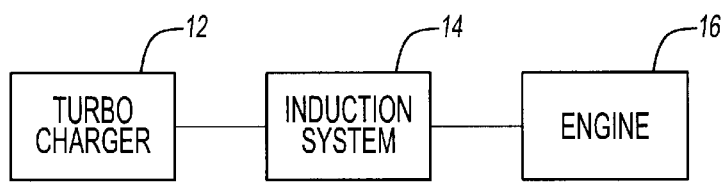
FIG. 1 is a schematic diagram of an engine induction system with a turbo charger.

As shown in FIG. 1, a turbo charger 12 is mounted within an induction system 14 for a vehicle engine 16. The use of a turbo charger 12 is an effective way to increase engine power without increasing the size of the engine 16. The operation of turbo chargers is well known and will not be discussed in further detail.

During operation, the turbo charger 12 generates a high frequency whistling noise. The subject invention is directed toward a flow tube, shown generally at 18 in FIG. 2, that is installed within the flow path of the induction system 14, and which attenuates frequencies above a predetermined level to reduce the high frequency whistling noise.

The flow tube 18 includes a first tube half or tubular portion 20, a second tubular portion 22, and a noise attenuation plate portion 24. The first tubular portion 20, the second tubular portion 22 and the plate portion 24 can be formed as separate pieces that are subsequently assembled together or can be formed as a single tubular piece. Further the flow tube 18 can be formed from any type of material known in the art.

In the preferred embodiment, the flow tube 18 is formed from plastic in an injection molding process. This unique process is described in co-pending application Ser. No. 10/256,279 filed on Sep. 26, 2002, which is assigned to the same assignee as the subject invention and is herein incorporated by reference. In this preferred process, the tubular portions 20, 22 and the plate portion 24 are formed from a common plastic material within a common mold 26 during an injection molding process. Any type of plastic material known in the art can be used. Thus, the first 20 and second 22 tubular portions and the plate portion 24 are integrally formed together as a single piece in an injection molding process. Any type of injection molding process known in the art can be used.

The first tubular portion 20, the second tubular portion 22, and the plate portion 24 are preferably positioned in a laterally spaced configuration in the mold 26 with the plate portion 24 at one end. In other words, the first tubular portion 20 is laterally separated from the plate portion 24 by the second tubular portion 22 during the molding process. A first living hinge 28 is formed between the plate portion 24 and the second tubular portion 22 and a second living hinge 30 is formed between the first 20 and second 22 tubular portions.

Figure 3:
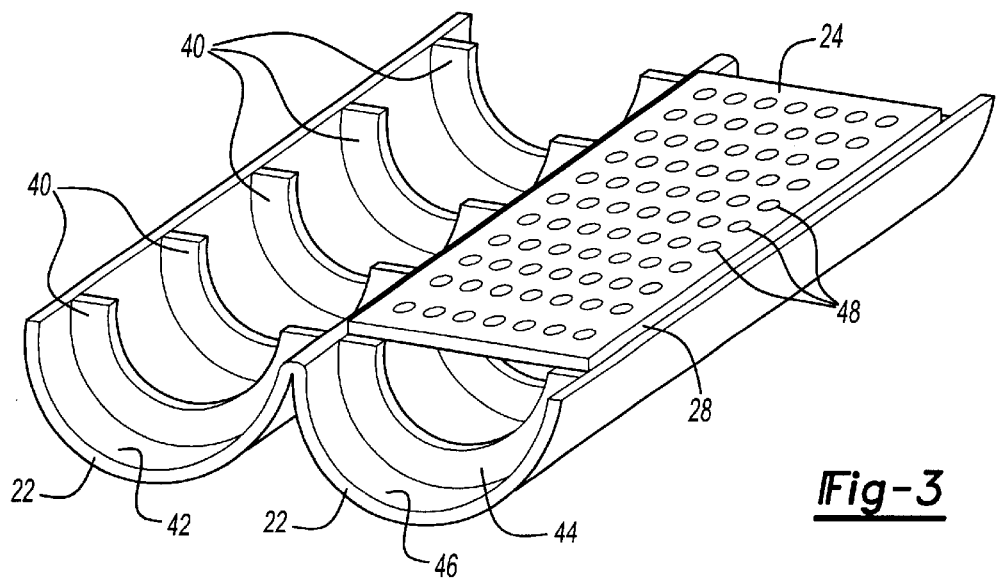
FIG. 3 is a perspective view of the flow tube of FIG. 2 with the plate folded over one of the tube halves.
Figure 4:
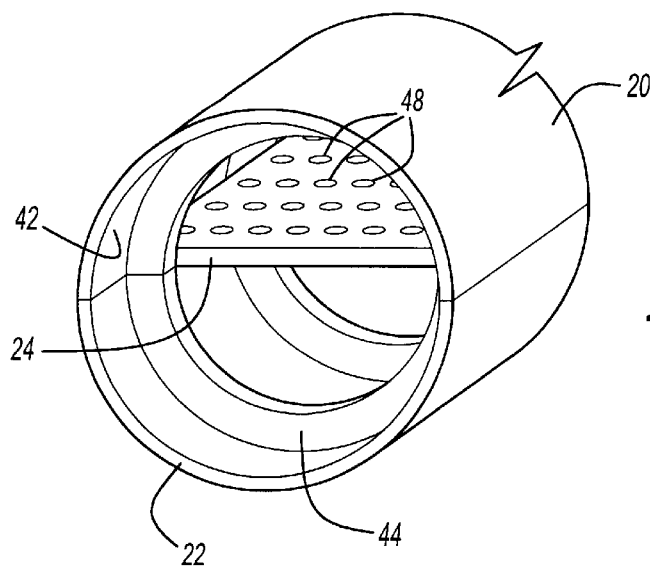
FIG. 4 is a perspective view of the flow tube of FIG. 3 showing the other tube half in a folded position.

After removal from the mold 26, the plate portion 24 is folded along one edge via the first living hinge 28 to be positioned in an overlapping relationship to the second tubular portion 22 as shown in FIG. 3. Next, the first tubular portion 20 is folded along one edge via the second living hinge 30 to be positioned in an overlapping relationship to the plate portion 24 and the second tubular portion 22, as shown in FIG. 4.

Figure 5:
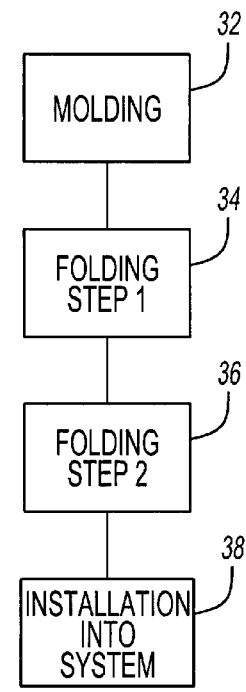
FIG. 5 is a flowchart describing the inventive method.

The steps for this method are shown in the flowchart of FIG. 5. First the tubular portions 20, 22 and the plate portion 24 are integrally molded as a single piece as indicated at 32. Next, the first folding step for the plate 24 is performed, as indicated at 34 and then the second folding step for the first tubular portion 20 is performed, as indicated at 36. Once the folding steps 34, 36 are completed, a flow tube 18 having a generally circular cross-section with a central internal flow path and an internally positioned plate 24 is formed. This flow tube 18 is then installed within the induction system 14 at step 38.

Figure 2:
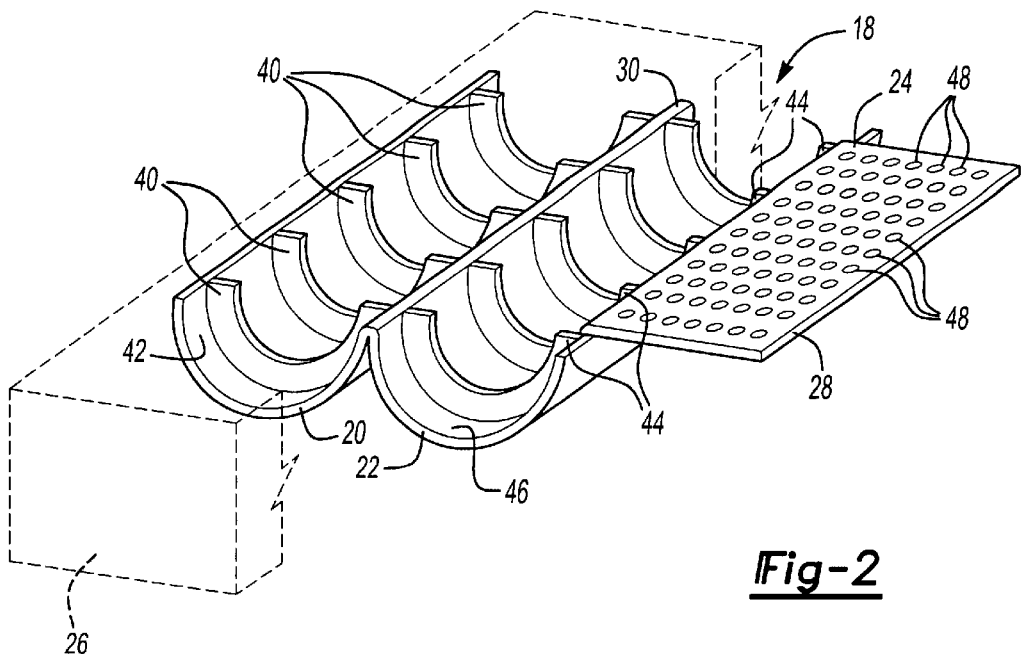
FIG. 2 is a perspective view of a flow tube for the induction system of FIG. 1 with first and second tube halves and a plate molded as a single piece in a mold half.

As shown in FIG. 2, the first tubular portion 20 includes a first plurality of ribs 40 formed on a first inner surface 42. Each rib 40 is longitudinally spaced apart from the next rib 40 along the length of the first tubular portion 20. Each rib 40 is approximately spaced apart from the next rib 40 by a predetermined approximately equal distance. The second tubular portion 22 includes a second plurality of ribs 44 formed on a second inner surface 46. Each rib 44 is longitudinally spaced apart from the next rib 44 along the length of the second tubular portion 22. Each rib 44 is approximately spaced apart from the next rib 44 by a predetermined approximately equal distance. When the first tubular portion 20 is folded over the second tubular portion 22, each one of the first plurality of ribs 40 is aligned with one of the second plurality of ribs 44 (see FIG. 4).

Figure 6:
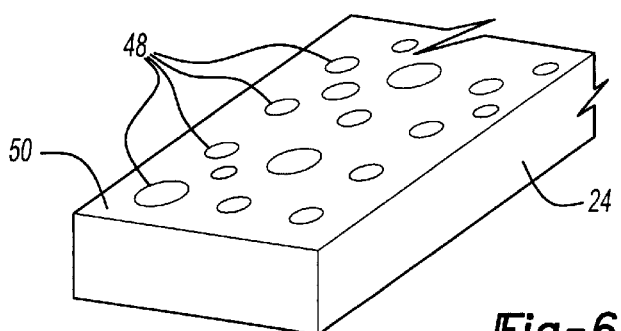
FIG. 6 is a perspective view, partially broken away, showing a plate having varying hole sizes.

As shown in FIG. 2, the plate portion 24 includes a plurality of depressions or openings 48 formed in a top surface 50. The openings 48 can be formed in a symmetrical pattern as shown in FIGS. 2 and 3, or in a non-symmetrical pattern as shown in FIG. 6. Further, the openings 48 can be of approximately the same size as shown in FIGS. 2 and 3 or can be formed of varying sizes as shown in FIG. 6.

Figure 7:
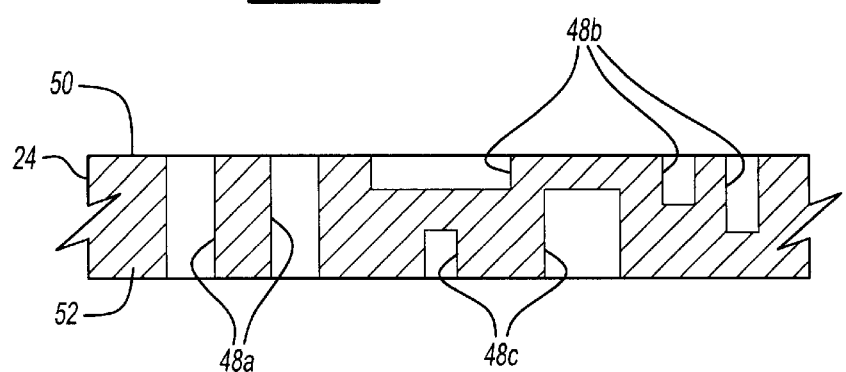
FIG. 7 is a side view showing a plate having varying opening depths.

Finally, the openings 48 can also be of varying depth from each other as shown in FIG. 7. Some of the openings 48 can extend from the top surface 50 to a bottom surface 52 to form a through hole 48a, some of the openings 48 can extend from the top surface into the plate portion 24 to form an upper recess or depression 48b, and/or some of the openings 48 can extend from the bottom surface 52 into the plate portion 24 to form a lower recess or depression 48c.

The ribs 40, 44 and the plate portion 24 with the openings 48 cooperate to form a low pass filter in the flow tube 18. The ribs 40, 44 are equally spaced apart from the next rib to allow tuning at a predetermined specific frequency. The openings 48 are also formed in a specific predetermined size, depth, and pattern for tuning purposes. The tuned ribs 40, 44 and tuned openings 48 cooperate to attenuate frequencies above a predetermined level, while allowing lower frequencies through. When acoustic energy created by the turbo charger 12 encounters the low pass filter, the change in impedance causes acoustic reflections back toward the turbo charger 12. Further, because the tubular portion 20, 22 and the plate portion 24 are integrally formed from a plastic material there is minimal risk of engine contamination.

While in the preferred embodiment the ribs 40, 44 are formed in the first 20 and second 22 tubular portions and then aligned with one another during assembly, in an alternate embodiment, a ribbed flow tube 60 could be used as shown in FIG. 8. The ribbed flow tube 60 includes a generally circular cross-section with an inner surface 62 and an outer surface 64. The inner surface 62 defines a longitudinal flow path. A plurality of ring-shaped ribs 66 that are spaced apart from each other along the longitudinal flow path. As described above, the ribs 66 are preferably spaced apart from each other by an equal distance and are tuned to a desired frequency.

In this embodiment, a noise attenuation plate 68 is separately installed in the flow tube 60. The plate 68 includes openings 70 formed in any of the embodiments discussed above and is positioned within the flow path. The plate 68 could be installed to engage end faces 72 of the ribs, or optionally, the ribs 66 could include slots or cut-outs 74, indicated by the dashed lines, that would receive and hold the plate 68 in place.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of reducing high frequency noise in an induction system with a turbo charger comprising the steps of:
    a) providing a flow tube defining a flow path;
    b) positioning a plate within the flow path parallel to the length of the flow tube to separate the flow tube into first and second chambers;
    c) forming a plurality of ribs on an internal surface of the flow tube in both the first and second chambers such that the ribs are tuned to attenuate a predetermined frequency;
    d) forming a plurality of depressions within the plate with each depression having a predetermined size and shape to attenuate a predetermined frequency; and
    attenuating frequencies above a predetermined level as acoustic energy generated by a turbo charger enters the flow path and encounters the plate with the ribs and depressions cooperating together to form a low pass filter that attenuates frequencies above the predetermined level as the acoustic energy enters the flow path.

2. A method as set forth in claim 1 further including forming depressions on an upper and lower surface of the plate.

3. A method as set forth in claim 2 wherein the depressions are formed on the upper and lower surfaces in a symmetrical pattern.

4. A method as set forth in claim 2 wherein the depressions are formed on the upper and lower surfaces in a non-symmetrical pattern.

5. A method as set forth in claim 1 wherein each depression extends at least partially through the thickness of the plate with at least one depression of said plurality of depressions having a different depth than another depression of said plurality of depressions.

6. A method as set forth in claim 1 wherein each rib is spaced an approximately equal distance from the adjacent rib.

7. A method as set forth in claim 1 wherein step (b) further includes forming a first set of depressions on an upper surface of the plate, forming a second set of depressions on a lower surface of the plate, and positioning the plate within the flow pat such that the first set of depressions face the first chamber and the second set of depressions face the second chamber.

8. A flow tube assembly comprising:

a flow tube having an inner surface defining a flow path;

a plate positioned with said flow path to form a low pass filter for attenuating frequencies above a predetermined level as acoustic energy generated by a turbo charger enters said flow path, said plate being defined by a width, a length, and a thickness with said width and length being significantly greater than said thickness and said plate being positioned within said flow tube such that said length extends parallel to said flow path to divide said flow tube solely into first and second chambers wherein said plate includes a plurality of depressions extending at least partially through said thickness;

a first set of ribs formed on an inner surface of said first chamber; and a second set of ribs formed on an inner surface of said second chamber with said first and second sets of ribs being tuned to cooperate with said depressions to attenuate frequencies above said predetermined level.

9. An assembly as set forth in claim 8 wherein said depressions are formed on upper and lower surfaces of said plate.

10. An assembly as set forth in claim 9 wherein said depressions are formed with varying depths.

11. An assembly as set forth in claim 9 wherein said depressions are formed with varying cross-sectional areas.

12. An assembly as set forth in claim 8 wherein each of said ribs is spaced apart from an adjacent rib by approximately an equal distance.

13. A turbo charger induction system comprising:

a flow tube having an inner surface defining a longitudinal flow path;

a plurality of ribs formed on said inner surface and spaced apart from each other along said longitudinal flow path; and a noise attenuation plate having a plurality of holes formed within said plate wherein said noise attenuation plate divides said flow tube into first and second chambers and is positioned in said flow path adjacent to said ribs with said ribs and noise attenuation plate cooperating together to attenuate frequencies above a predetermined level as acoustic energy generated by a turbo charger enters the flow path.

14. A system as set forth in claim 13 wherein at least one of said holes has a greater diameter than another of said holes and wherein at least one of said holes has a greater depth than another of said holes.

15. A system as set forth in claim 13 wherein each of said ribs is spaced approximately an equal distance from an adjacent rib.

16. A system as set forth in claim 13 wherein said flow tube is defined by a generally circular cross-sectional shape and wherein said ribs are generally ring shaped.

17. A system as set forth in claim 13 wherein said noise attenuation plate is mounted within said flow tube such that a length of said noise attenuation plate extends parallel to said longitudinal flow path.

18. A system as set forth in claim 17 wherein said ribs comprise a first plurality of ribs formed on an inner surface of said first chamber and a second plurality of ribs formed on an inner surface of said second chamber and positioned in alignment with said first plurality of ribs with said first and second pluralities of ribs being tuned to cooperate with said holes to attenuate frequencies above said predetermined level.

* * * * *